US008100762B2

(12) United States Patent
Pryzby et al.

(10) Patent No.: US 8,100,762 B2
(45) Date of Patent: *Jan. 24, 2012

(54) WAGERING GAME ADAPTIVE ON-SCREEN USER VOLUME CONTROL

(75) Inventors: Eric M. Pryzby, Skokie, IL (US); Paul Radek, Naperville, IL (US)

(73) Assignee: WMS Gaming Inc., Waukegan, IL (US)

( * ) Notice: Subject to any disclaimer, the term of this patent is extended or adjusted under 35 U.S.C. 154(b) by 914 days.

This patent is subject to a terminal disclaimer.

(21) Appl. No.: 11/914,837

(22) PCT Filed: May 17, 2006

(86) PCT No.: PCT/US2006/019109

§ 371 (c)(1), (2), (4) Date: Jan. 2, 2008

(87) PCT Pub. No.: WO2006/125013

PCT Pub. Date: Nov. 23, 2006

(65) Prior Publication Data

US 2008/0214289 A1 Sep. 4, 2008

Related U.S. Application Data

(60) Provisional application No. 60/681,696, filed on May 17, 2005.

(51) Int. Cl.
*A63F 13/02* (2006.01)
*A63F 9/24* (2006.01)

(52) U.S. Cl. ............................... 463/25; 463/35; 463/43

(58) Field of Classification Search ............. 463/25–36, 463/40–42
See application file for complete search history.

(56) References Cited

U.S. PATENT DOCUMENTS

| | | | | |
|---|---|---|---|---|
| 6,968,063 | B2 * | 11/2005 | Boyd | 381/57 |
| 7,033,276 | B2 * | 4/2006 | Walker et al. | 463/40 |
| 7,112,139 | B2 * | 9/2006 | Paz Barahona et al. | 463/35 |
| 7,789,748 | B2 * | 9/2010 | Landrum et al. | 463/20 |
| 2003/0028516 | A1 * | 2/2003 | Nakata et al. | 707/1 |
| 2003/0114214 | A1 * | 6/2003 | Barahona et al. | 463/20 |
| 2004/0029637 | A1 * | 2/2004 | Hein et al. | 463/35 |
| 2004/0142747 | A1 * | 7/2004 | Pryzby | 463/35 |
| 2005/0211075 | A1 * | 9/2005 | Desai et al. | 84/645 |
| 2006/0199635 | A1 * | 9/2006 | Radek | 463/20 |

OTHER PUBLICATIONS

"International Search Report for Application No. PCT/US2006/19109, date mailed Sep. 12, 2007", 4 pgs.

"Written Opinion of the International Searching Authority for Application No. PCT/US2006/19109, date mailed Sep. 12, 2007", 5 pgs.

* cited by examiner

*Primary Examiner* — Masud Ahmed

(74) *Attorney, Agent, or Firm* — Schwegman, Lundberg & Woessner, P.A.

(57) ABSTRACT

A computerized wagering game system includes a gaming module comprising a processor and gaming code which is operable when executed on the processor to conduct a wagering game on which monetary value can be wagered, and an audio channel coupled to an adaptive on-screen user volume control. The volume control comprises a user setting and a master setting, wherein the user volume setting is operable to adjust the system volume over a limited volume range near the master volume setting, and wherein the master volume is operable to change over time based on user volume settings.

17 Claims, 3 Drawing Sheets

WAGERING GAME ADAPTIVE ON-SCREEN USER VOLUME CONTROL

RELATED APPLICATION

This application is a U.S. National Stage Filing under 35 U.S.C. 371 from International Patent Application Serial No. PCT/US2006/019109, filed May 17, 2006, and published on Nov. 23, 2006 as WO 2006/125013 A2, and republished on Nov. 23, 2006 as WO 2006/125013 A3, which claims the priority benefit of U.S. Provisional Application Ser. No. 60/681,696 filed May 17, 2005, the contents of which are incorporated herein by reference.

FIELD OF THE INVENTION

The invention relates generally to computerized wagering game machines, and more specifically to an adaptive on-screen volume control in a computerized wagering game machine.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, WMS Gaming, Inc.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games do not rely on the dealer or other game players to facilitate game play and to provide an entertaining game playing environment, but rely upon the presentation of the game and environment generated by the wagering game machine itself. Incorporation of audio and video features into wagering games to present the wagering game, to provide help, and to enhance the environment presented are therefore important elements in the attractiveness and commercial success of a computerized wagering game system. It is not uncommon for audio voices to provide instruction and help, and to provide commentary on the wagering game being played. Music and environmental effects are also played through speakers in some wagering game systems to enhance or complement a theme of the wagering game. These sounds typically accompany video presentation of the wagering game on a screen, which itself often includes animation, video, and three-dimensional graphics as part of presentation of the wagering game.

But, wagering game systems are placed in a variety of environments and are subject to a variety of conditions once installed. Quiet restaurants may desire a significantly lower overall volume than noisy casinos, but the restaurant may be louder during typical meal times and the casino may be significantly louder during the evening and night hours. A wagering game player playing a video slot machine at a casino during the early morning hours may desire the volume to be different than the volume during peak evening hours, just as a wagering game player in a restaurant may desire the volume to be louder during meal hours and softer during quiet times such as mid-morning or mid-afternoon. Giving the user complete control over the volume is one solution, but it fails to consider that the user may set the volume much higher or lower than the wagering game owner desires. Providing the wagering game system owner a variable master control solves this, but doesn't allow a user any flexibility for individual preferences or changing conditions.

It is therefore desired that an adaptive on-screen volume control be provided to allow user adjustment of volume relative to an adaptive master volume.

SUMMARY

One example embodiment of the invention comprises a computerized wagering game system including a gaming module comprising a processor and gaming code which is operable when executed on the processor to conduct a wagering game on which monetary value can be wagered, and an audio channel coupled to an adaptive on-screen user volume control. The volume control comprises a user setting and a master setting, wherein the user volume setting is operable to adjust the system volume over a limited volume range near the master volume setting, and wherein the master volume is operable to change over time based on user volume settings.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention comprises a computerized wagering game system including a gaming module comprising a processor and gaming code which is operable when executed on the processor to conduct a wagering game on which monetary value can be wagered, and an audio channel coupled to an adaptive on-screen user volume control. The volume control comprises a user setting and a master setting, wherein the user volume setting is operable to adjust the system volume over a limited volume range near the master volume setting, and wherein the master volume is operable to change over time based on user volume settings.

Figure 1:
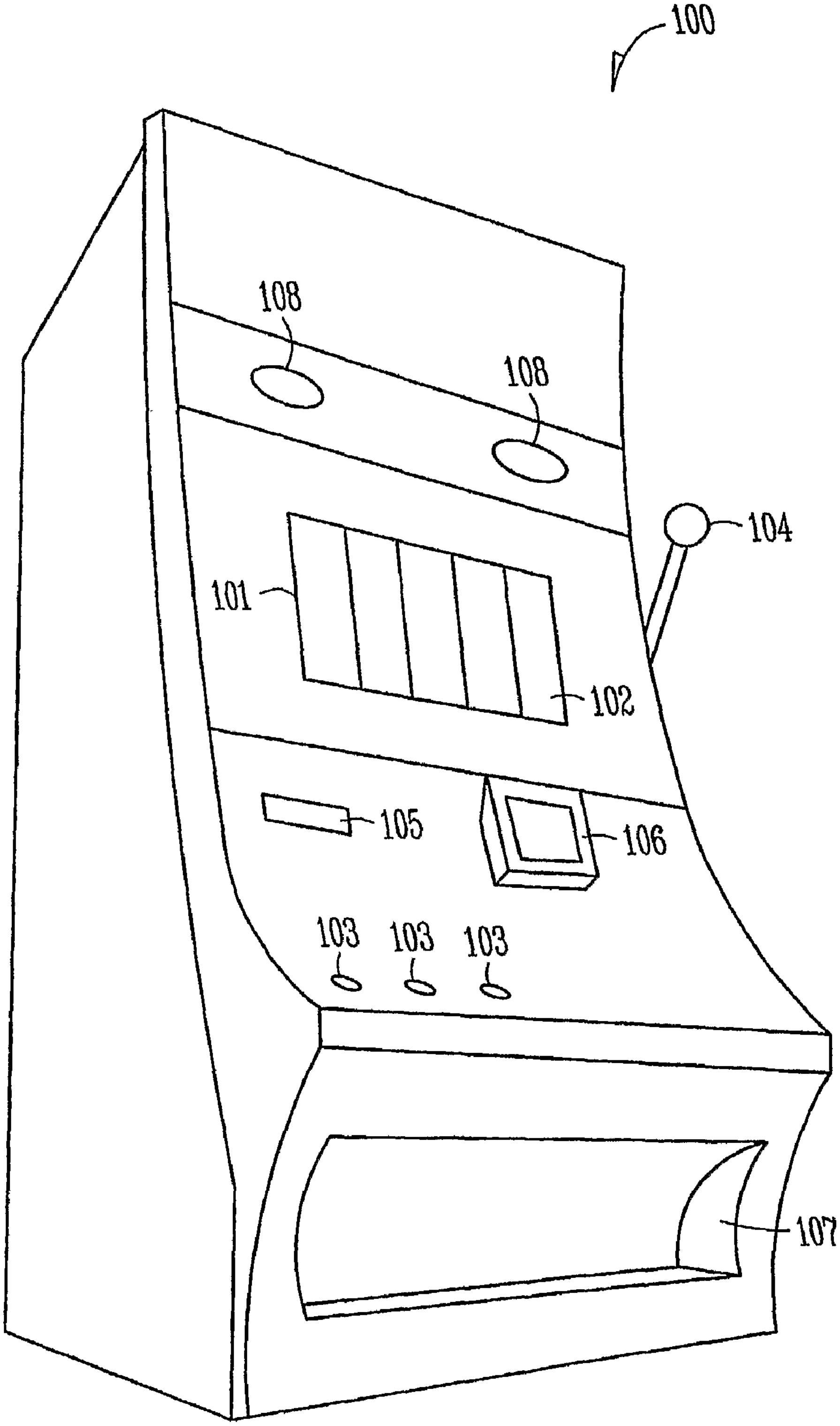
FIG. 1 shows a computerized wagering game machine, as may be used to practice some example embodiments of the invention.

FIG. 1 illustrates a computerized wagering game machine, as may be used to practice some embodiments of the present invention. The computerized gaming system shown generally at 100 is a video wagering game system, which displays information for at least one wagering game upon which monetary value can be wagered on video display 101. Video display 101 is in various embodiments a CRT display, a plasma display, an LCD display, a surface conducting electron emitter display, or any other type of display suitable for displaying electronically provided display information. Alternate embodiments of the invention will have other game indicators, such as mechanical reels instead of the video graphics reels shown at 102 that comprise a part of a video slot machine wagering game.

A wagering game is implemented using software within the wagering game system, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The game implemented via the loaded software takes various forms in different wagering game machines, including such well-known wagering games as reel slots, video poker, blackjack, craps, roulette, or hold'em games. The wagering game is played and controlled with inputs such as various buttons 103 or via a touchscreen overlay to video screen 101. In some alternate examples, other devices such as pull arm 104 used to initiate reel spin in this reel slot machine example are employed to provide other input interfaces to the game player.

Monetary value is typically wagered on the outcome of the games, such as with tokens, coins, bills, or cards that hold monetary value. The wagered value is conveyed to the machine through a changer 105 or a secure user identification module interface 106, and winnings are returned via the returned value card or through the coin tray 107. Sound is also provided through speakers 108, typically including audio indicators of game play, such as reel spins, credit bang-ups, and environmental or other sound effects or music to provide entertainment consistent with a theme of the computerized wagering game. The wagering game system takes alternate forms in some embodiments of the invention, such as a portable wireless wagering game device or a user-supplied device operable to present a wagering game conducted on a server. In some further embodiments, the wagering game machine is coupled to a network, and is operable to use its network connection to receive wagering game data, track players and monetary value associated with a player, and to perform other such functions.

The volume of speakers 108 is controlled in one example embodiment of the invention by both a master volume and a user volume control, which work together to determine the overall system volume provided to the wagering game's speakers 108. The user volume control is operable to adjust the volume in a limited volume range around the master volume level, such that the user is not able to adjust the system volume to a level very different from the master volume setting. The master volume is operable to change based on user system volume settings, such that if an average user or a majority of users increase the volume level relative to the preselected master volume level, the master volume increases accordingly.

In further embodiments, the master volume is operable to vary by time of day, and user volume setting information is tracked based on time of day so that appropriate adjustments to the master volume can be made specific to the time of day of the user volume adjustments.

Figure 2:
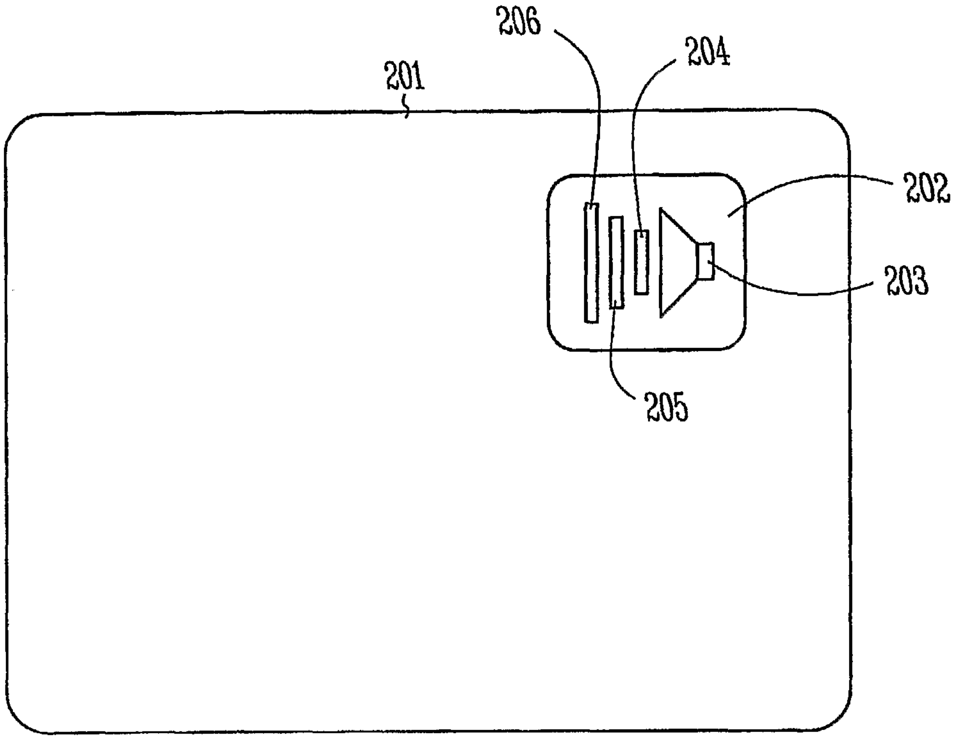
FIG. 2 shows a touchscreen on-screen user volume control, consistent with some example embodiments of the invention.

FIG. 2 shows an on-screen volume control button, as is provided to enable the user to adjust the user volume setting in some example embodiments of the invention. The touchscreen video display 201 of the wagering game system has a user volume control icon 202 displayed in one corner, and is operable to change the user volume control setting upon actuation of the touchscreen control. For example, touching the button 202 repeatedly causes the volume to increase from a lowest setting to a medium setting on a first touch, and then to a highest of three settings on a second touch. Subsequent touches can either cause the volume change to reverse direction, making the user volume setting progressively quieter, or start over at the lowest volume setting so that actuating the touchscreen user volume control 202 always causes the user volume to increase incrementally or reset to the lowest volume setting.

The user volume control 202 comprises an image of a speaker at 203, a lowest user volume setting bar 204, a medium user volume setting bar 205, and a highest user volume setting bar 206. The speaker is highlighted, as is the bar indicating the lowest user volume setting. When the medium volume setting is selected, the medium user volume setting bar 205 is also highlighted or illuminated in a bright color, but the highest user volume setting bar 206 is dark, indicating that the medium volume setting is selected. When a particular user volume setting is selected, the bar corresponding to the user volume setting and all bars corresponding to quieter user volume settings are illuminated, as is shown in FIG. 2. Here, because the medium user volume level is selected, both the medium user volume bar 205 and the lowest user volume level bar 204 are highlighted, in addition to the speaker which remains highlighted whenever the user has control over the user volume setting.

Figure 3:
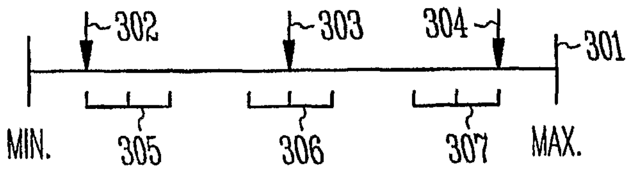
FIG. 3 shows a system volume range illustrating various master volume levels and associated user volume control ranges, consistent with some example embodiments of the invention.

In some embodiments of the invention, the middle user volume bar 205 always represents the master volume level as selected by the wagering game machine's administrators. In other embodiments, the default user volume level changes such that the user's ability to control the system volume relative to the master volume is limited based on the master volume setting. FIG. 3 illustrates a system volume scale showing how user volume settings vary relative to different master volume levels, consistent with an example embodiment of the invention.

The system volume 301 ranges from a minimum level to a maximum level, and a master volume control sets the master system volume at a level such as a low master volume setting 302, a medium system volume level 303, or a high system volume level 304. The user volume ranges associated with each volume level are shown below each master volume setting, including the user range for a low master volume setting at 305, the user range for a medium volume setting at 306, and the user volume range for a high master volume setting as shown at 307.

Each user volume range has three discrete volume levels marked corresponding to the low, medium, and high volume settings as shown and described in conjunction with the user volume level touchscreen control of FIG. 2. The user volume range 305 corresponding to the low master volume setting at 302 enables the user to either select the master volume level, or one of two discrete volume levels higher in overall volume than the master volume level. The user is therefore able to increase the volume above the master volume level setting, but is not able to decrease the system volume below the already low master volume setting.

Similarly, the high master volume setting 304 has a user volume setting range 307 that has three discrete volume settings. The highest user volume setting corresponds to the master volume setting, while the middle and lowest user volume settings allow the user to decrease the system volume from the relatively high master volume level. The medium master volume level shown at 303 also has a user volume range 306 having three discrete settings, but because the master volume level is moderate, the user volume settings allow the user to adjust the overall system volume above or below the master volume setting.

In some embodiments, the user volume adjustments vary dependent on which of three discrete volume zones the master volume falls into, while in other embodiments the user volume range's position relative to the master volume varies continuously as a function of the master volume. For example, a moderate to low master volume level wound not result in either the low user volume configuration shown at 305 or the middle volume configuration shown at 303 taken relative to the corresponding master volumes 302 and 303, but would be somewhere in-between, such that the master volume level would be located someplace between the middle and lowest user volume setting on the system volume scale.

The user volume adjustments can provide clues over time as to the appropriateness or desirability of the chosen master volume levels. If a master volume level is chosen too low for a particular machine at a particular time, users who utilize the user volume control will likely consistently use the user volume to turn up the volume level. Similarly, if the master volume level is chosen too high, the users are likely to consistently turn down the volume via the user volume control. For this reason, some embodiments of the invention are not as restrictive regarding user volume preferences as is shown in FIG. 3, but always allow at least one step of user volume increase and decrease from a master volume level so that user preferences can be used to both increase and decrease any given master volume level.

In a further embodiment, volume profiles are used and are operable to set volume levels relative to the master volume control. For example, a normal game play volume profile may have a default volume setting that is softer than an attract mode volume profile, but include a louder volume level for bonus events. In embodiments incorporating volume profiles such as these, or in other systems using volume controls other than or in addition to a master volume level, the user volume control can be tracked over time to change the volume profile rather than the master volume level. The volume control in further embodiments can also be configured to allow changes to some volume profiles, and not to others.

For example, in a wagering game system having an attract mode volume profile, a game play profile, and a bonus round volume profile, the wagering game may be configured to allow user volume preferences to change only the game play and bonus round volume profiles, but not the attract mode volume profile. If a consistent pattern of reducing the volume of the bonus round sound is observed, the bonus round volume profile can be incrementally lowered using the adaptive user volume control methods described here without affecting the attract or game play mode volumes.

Figure 4:
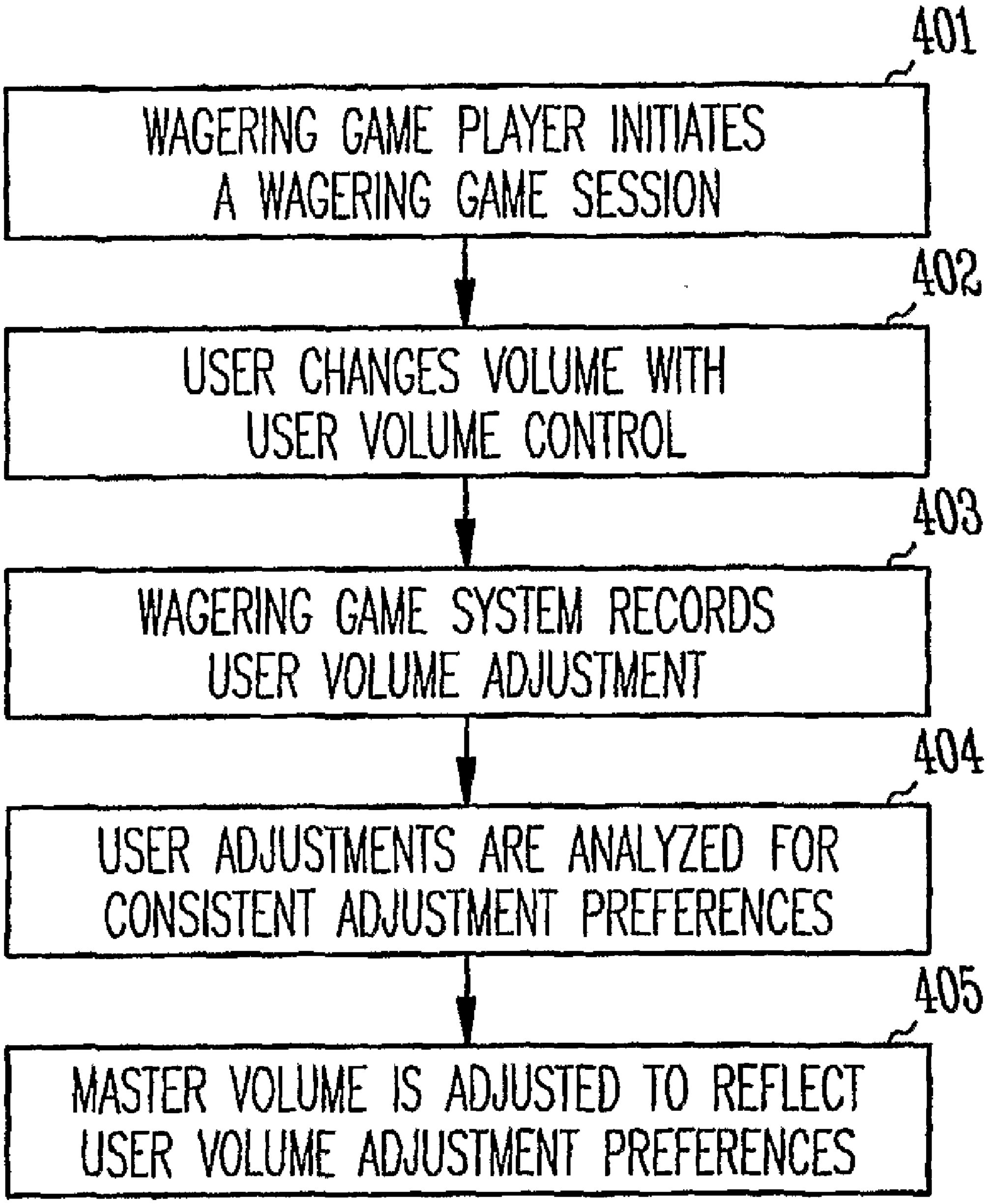
FIG. 4 is a flowchart illustrating a method of adjusting a master volume control based on user volume preferences, consistent with some example embodiments of the invention.

FIG. 4 is a flowchart, illustrating a method of adjusting the master volume based on observed use of the user volume control, consistent with an example embodiment of the invention. The user initiates a wagering game session at 401, such as by depositing coins or credits via a player card, and plays at least one round of a wagering game. It is desirable to include a requirement that a user deposit credits or play a round in some embodiments so that the machine is able to distinguish between actual users and those simply fiddling with the machine, and so that a single user's adjustments can be identified and weighted against the preferences of other wagering game players.

At 402, the wagering game player uses the user volume control to adjust the volume to a desired level. The wagering game system is operable to track user volume changes, and records the user volume change at 403. The user volume change and previous user volume adjustments are analyzed at 404 to determine whether users consistently have a specific volume adjustment preference relative to a specific master volume setting. If there is a clear user preference, the master volume level is adjusted at 405 to reflect the user volume preference.

In one such example, the wagering game system adjusts the master volume if a specified percentage of people using the wagering game system change the user volume in a certain direction for a given master volume and set of environmental conditions such as time of day. In another example, the master volume is changed if a specific number of people who have changed the volume using the user volume control have changed the volume in a certain direction. If only a small percentage of people use the user volume adjustment feature, but a vast majority of those who use it increase the volume, it is still deemed prudent in such a system to increase the master volume setting to reflect user preferences.

Some wagering game systems will be preset to vary their master volume levels or other similar volume levels at different times of the day, or based on various other environmental parameters such as perceived noise or wagering game activity. Such wagering game systems will in some embodiments of the invention utilize a user volume control and a master volume control that changes based on patterns of user volume settings. In such embodiments, it is desirable to track the user preferences based on time of day, so that adjustments made while a master volume control is set at a specific level in the morning are distinguished from user volume adjustments made while the master volume setting is at the same position in the afternoon. This enables adjustment of the master volume control by time of day, so that the eventual master volume control settings reflect both user preferences for a specific machine or location but also for the changing environment during the course of a typical day.

In some further embodiments where multiple wagering game machines are coupled via a network, the data regarding user volume setting preferences is collected and shared with other machines nearby or having a similar environment, so that the master volume adjustments based on user volume setting preferences reflect the preferences of more wagering game players across more wagering game machines. This enables a better estimation of average user preferences, and reduces the chances of specific machines being adjusted significantly differently from their neighbors based on user preferences for specific “favorite” or “lucky” machines, ensuring that no single wagering game machine’s sound dominates an area or is difficult to hear in a certain environment due to learned user preferences causing a change in master volume levels.

The various example embodiments presented here illustrate how wagering game systems can utilize an on-screen user volume control to enable a user to tailor volume levels to a desired level within a specific range, and how such user volume preferences can be used over time to adjust a master volume control setting to a more desirable master volume level for a given environment. It has further shown how user volume adjustments can be limited or varied based on the master volume level, such that relatively low master volume levels can be primarily increased in volume while relatively high master volume levels can be primarily decreased via the user volume settings.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A computerized wagering game system, comprising:

a gaming module comprising a processor and gaming code which is operable when executed via the processor to present a wagering game on which monetary value can be wagered, and further comprising at least one audio channel operable to produce sound; and a volume control comprising a user volume setting and an adaptive master volume setting, wherein the user volume setting is adjustable by user input over a limited volume range near the adaptive master volume setting, wherein the gaming module, via the processor, is operable to store user volume setting adjustments associated with a wagering game player and adjust the adaptive master volume setting based on the stored user volume setting adjustments.

2. The computerized wagering game system of claim 1, wherein the user volume setting is adjusted via user actuation of a touchscreen button.

3. The computerized wagering game system of claim 1, wherein the user volume setting adjustments of the plurality occur during a current wagering game playing session.

4. The computerized wagering game system of claim 1, wherein the master volume setting varies according to a time of day.

5. A computerized wagering game system, comprising:

a gaming module comprising a processor and gaming code which is operable when executed via the processor to present a wagering game on which monetary value can be wagered, and further comprising at least one audio channel operable to produce sound; and a volume control comprising a user volume setting and an adaptive master volume setting, wherein the user volume setting is adjustable by user input over a limited volume range near the adaptive master volume setting, wherein the gaming module, via the processor, is operable to adjust the adaptive master volume setting such that the adaptive master volume setting is an average of two or more user volume settings.

6. A computerized wagering game system, comprising:

a gaming module comprising a processor and gaming code which is operable when executed via the processor to present a wagering game on which monetary value can be wagered, and further comprising at least one audio channel operable to produce sound; and a volume control comprising a user volume setting and an adaptive master volume setting, wherein the user volume setting is adjustable by user input over a limited volume range near the adaptive master volume setting, the user volume setting is limited to being greater than or equal to the adaptive master volume setting when the adaptive master volume setting is at a low level, and is limited to being less than or equal to the adaptive master volume setting when the adaptive master volume setting is at a high level, wherein the gaming module, via the processor, is operable to adjust the adaptive master volume setting over time based on a plurality of user volume setting adjustments.

7. A method of operating a computerized wagering game machine, comprising:

presenting, via a display, a wagering game on which monetary value can be wagered;

storing user volume setting adjustments associated with a wagering game player; and controlling a volume of at least one audio signal via a user volume setting and an adaptive master volume setting, wherein the user volume setting is adjustable by user input over a limited volume range near the adaptive master volume setting, wherein the adaptive master volume setting is adjustable over time, via the processor, based on the stored user volume setting adjustments.

8. A method of operating a computerized wagering game machine, comprising:

presenting, via a display, a wagering game on which monetary value can be wagered; and controlling a volume of at least one audio signal via a user volume setting and an adaptive master volume setting, wherein the user volume setting is adjustable by user input over a limited volume range near the adaptive master volume setting, wherein the adaptive master volume setting is adjustable over time, via the processor, such that the adaptive master volume setting is an average of two or more user volume settings.

9. The method of claim 8, wherein the user volume setting is adjusted via user actuation of a touchscreen button.

10. The method of claim 8, wherein the user volume setting adjustements occur during a current wagering game playing session.

11. The method of claim 8, wherein the adaptive master volume setting varies according to a time of day.

12. A method of operating a computerized wagering game machine, comprising:

presenting, via a display, a wagering game on which monetary value can be wagered; and controlling a volume of at least one audio signal via a user volume setting and an adaptive master volume setting, wherein the user volume setting is adjustable by user input over a limited volume range near the adaptive master volume setting, the user volume setting is limited to being greater than or equal to the adaptive master volume setting when the adaptive master volume setting is at a low level and is limited to being less than or equal to the adaptive master volume setting when the adaptive master volume setting is at a high level, wherein the adaptive master volume setting is adjustable over time, via the processor, based on analysis of user volume setting adjustments.

13. A wagering game system including a gaming module, the gaming module comprising a processor and being operable to:

control a volume of at least one audio signal via a user volume setting and an adaptive master volume setting, wherein the user volume setting is adjustable by user input over a limited volume range near the adaptive master volume setting;

define a plurality of volume profiles having associated master volume settings, the volume profiles including one or more of a game play profile, a bonus round profile, and an attract mode profile;

record over time, via the processor, a plurality of user volume setting adjustments;

analyze, via the processor, the plurality of user volume setting adjustments in relation to the volume profile during which the user volume setting adjustments occur, to determine an adjustment pattern; and adjust the adaptive master volume setting associated with a particular volume profile to correspond to the determined adjustment pattern.

14. A wagering game system including a gaming module, the gaming module comprising a processor and being operable to:

control a volume of at least one audio signal via a user volume setting and an adaptive master volume setting, wherein the user volume setting is adjustable by user input over a limited volume range near the adaptive master volume setting;

record over time, via the processor, a plurality of user volume setting adjustments;

analyze, via the processor, the plurality to determine an adjustment pattern, the determined adjustment pattern indicating a user preference for higher volume in relation to the master volume setting; and adjust the adaptive master volume setting to a higher volume setting.

15. A wagering game system including a gaming module, the gaming module comprising a processor and being operable to:

control a volume of at least one audio signal via a user volume setting and an adaptive master volume setting, wherein the user volume setting is adjustable by user input over a limited volume range near the adaptive master volume setting;

record over time, via the processor, a plurality of user volume setting adjustments;

analyze, via the processor, the plurality to determine an adjustment pattern corresponding to an average of user volume settings over time; and adjust the adaptive master volume setting towards the average of the user volume settings.

16. A wagering game system including a gaming module, the gaming module comprising a processor and being operable to:

control a volume of at least one audio signal via a user volume setting and an adaptive master volume setting, wherein the user volume setting is adjustable by user input over a limited volume range near the adaptive master volume setting;

record over time, via the processor, a plurality of user volume setting adjustments;

analyze, via the processor, the plurality to determine an adjustment pattern, the determined adjustment pattern indicating a user preference for lower volume in relation to the master volume setting; and adjust the adaptive master volume setting to a lower volume setting.

17. A wagering game system including a gaming module, the gaming module comprising a processor and being operable to:

control a volume of at least one audio signal via a user volume setting and an adaptive master volume setting, wherein the user volume setting is adjustable by user input over a limited volume range near the adaptive master volume setting;

record over time, via the processor, a plurality of user volume setting adjustments;

analyze, via the processor, the plurality to determine an adjustment pattern, the determined adjustment pattern indicating a consistent user preference at a particular time of day; and adjust the adaptive master volume setting during the particular time of day.

* * * * *

UNITED STATES PATENT AND TRADEMARK OFFICE

CERTIFICATE OF CORRECTION

PATENT NO. : 8,100,762 B2
APPLICATION NO. : 11/914837
DATED : January 24, 2012
INVENTOR(S) : Eric M. Pryzby et al.

It is certified that error appears in the above-identified patent and that said Letters Patent is hereby corrected as shown below:

In column 8, line 56, in Claim 10, delete “adjustements” and insert -- adjustments --, therefor.

Signed and Sealed this
Seventeenth Day of April, 2012

David J. Kappos
*Director of the United States Patent and Trademark Office*